(12) United States Patent
Harada

(10) Patent No.: US 7,508,592 B2
(45) Date of Patent: Mar. 24, 2009

(54) ZOOM LENS SYSTEM

(75) Inventor: Hiroki Harada, Ichikawa (JP)

(73) Assignee: Nikon Corporation, Tokyo (JP)

( * ) Notice: Subject to any disclaimer, the term of this patent is extended or adjusted under 35 U.S.C. 154(b) by 61 days.

(21) Appl. No.: 11/516,710

(22) Filed: Sep. 7, 2006

(65) Prior Publication Data
US 2007/0070517 A1    Mar. 29, 2007

(30) Foreign Application Priority Data
Sep. 28, 2005    (JP)    ............... 2005-282921

(51) Int. Cl.
*G02B 15/177*    (2006.01)
(52) U.S. Cl. ........................... 359/680; 359/676
(58) Field of Classification Search ................ 359/676, 359/680, 682
See application file for complete search history.

(56) References Cited

U.S. PATENT DOCUMENTS

| | | |
|---|---|---|
| 5,229,886 A | 7/1993 | Tanaka |
| 6,687,059 B2 | 2/2004 | Mihara |
| 6,967,782 B2 | 11/2005 | Mihara |
| 2001/0013978 A1 | 8/2001 | Mihara |

FOREIGN PATENT DOCUMENTS

| | | | |
|---|---|---|---|
| JP | 03-080210 A | | 4/1991 |
| JP | 4-264412 A | | 9/1992 |
| JP | 06-102455 A | | 4/1994 |
| JP | 08-005921 A | | 1/1996 |
| JP | 2001-174704 A | | 6/2001 |
| JP | 2001-318314 A | | 11/2001 |
| JP | 2004-212541 A | | 7/2004 |
| JP | 2004271937 A | * | 9/2004 |

* cited by examiner

*Primary Examiner*—Darryl J Collins
(74) *Attorney, Agent, or Firm*—Miles & Stockbridge P.C

(57) ABSTRACT

Providing a zoom lens system having higher optical performance, a wide, maximum angle of view of 80 degrees or more, a zoom ratio of about 2.7, and a fast aperture ratio with an f-number of about 2.8. The zoom lens system includes, in order from an object, a first lens group G1 having negative refractive power, a second lens G2 group having positive refractive power, a third lens group G3 having negative refractive power, a fourth lens group G4 having positive refractive power; and a fifth lens group G5 having positive refractive power. When zooming from a wide-angle end state W to a telephoto end state T, the first through fourth lens groups are moved, and the fifth lens group is fixed. Given conditional expressions are satisfied.

20 Claims, 8 Drawing Sheets

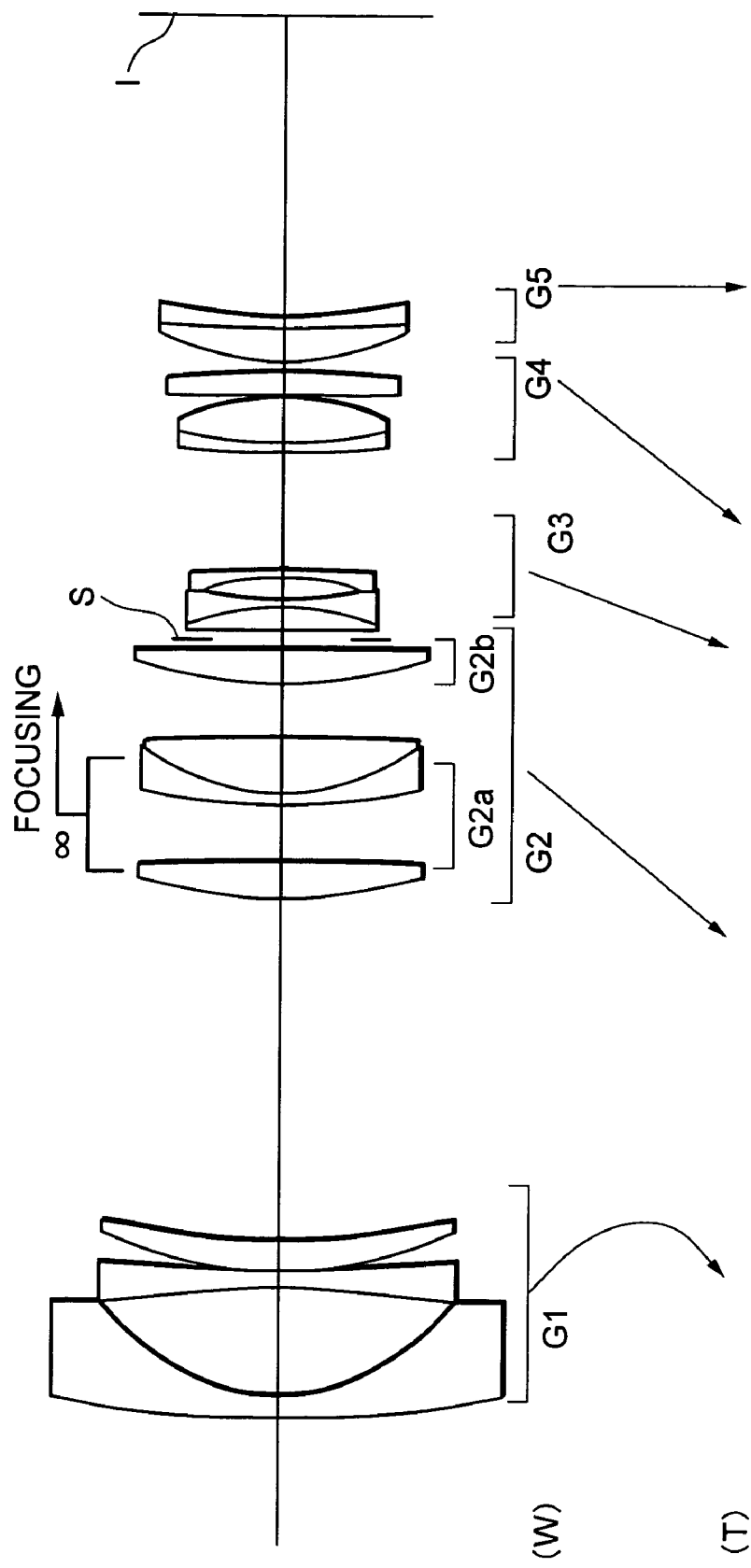

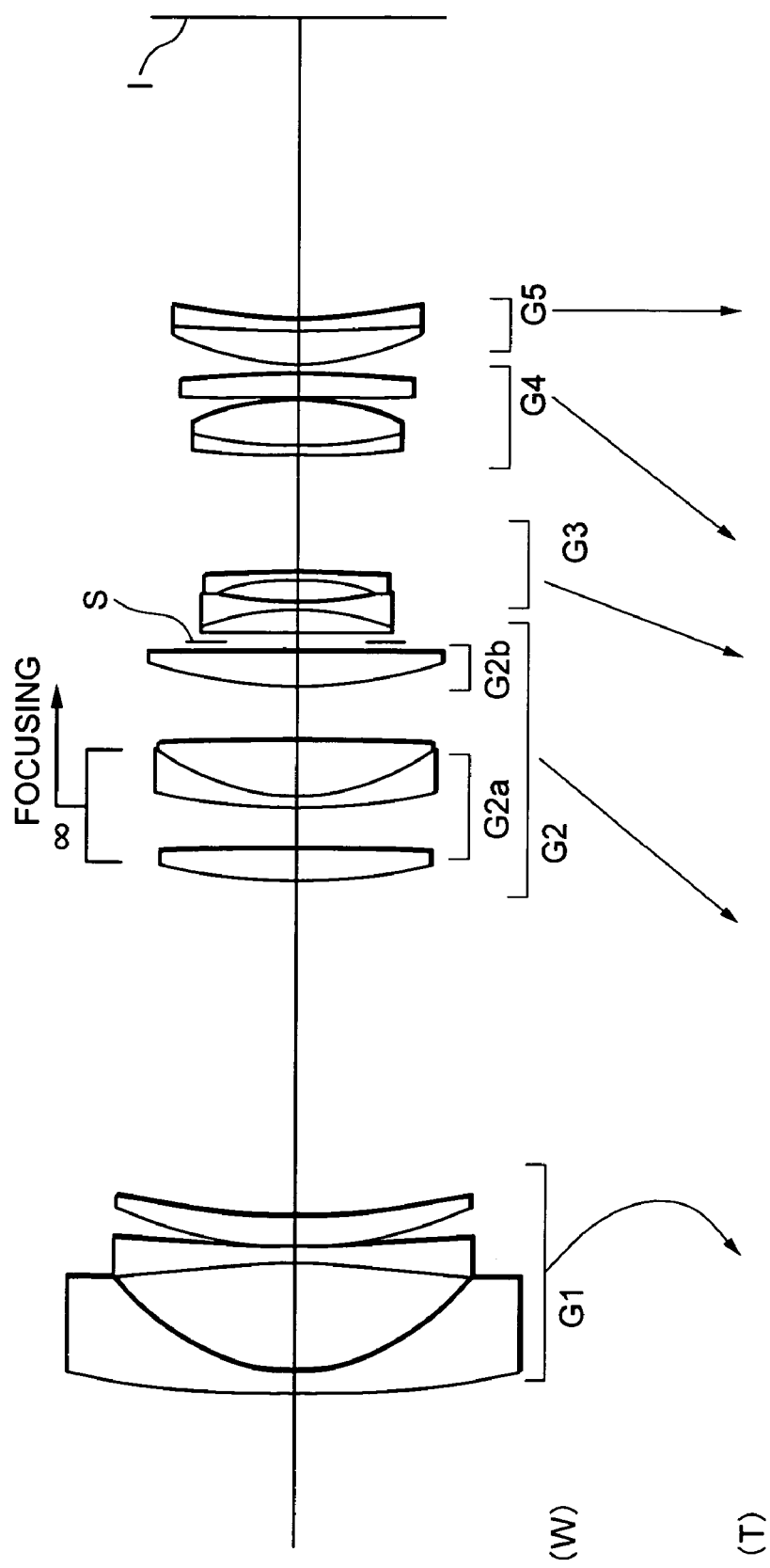

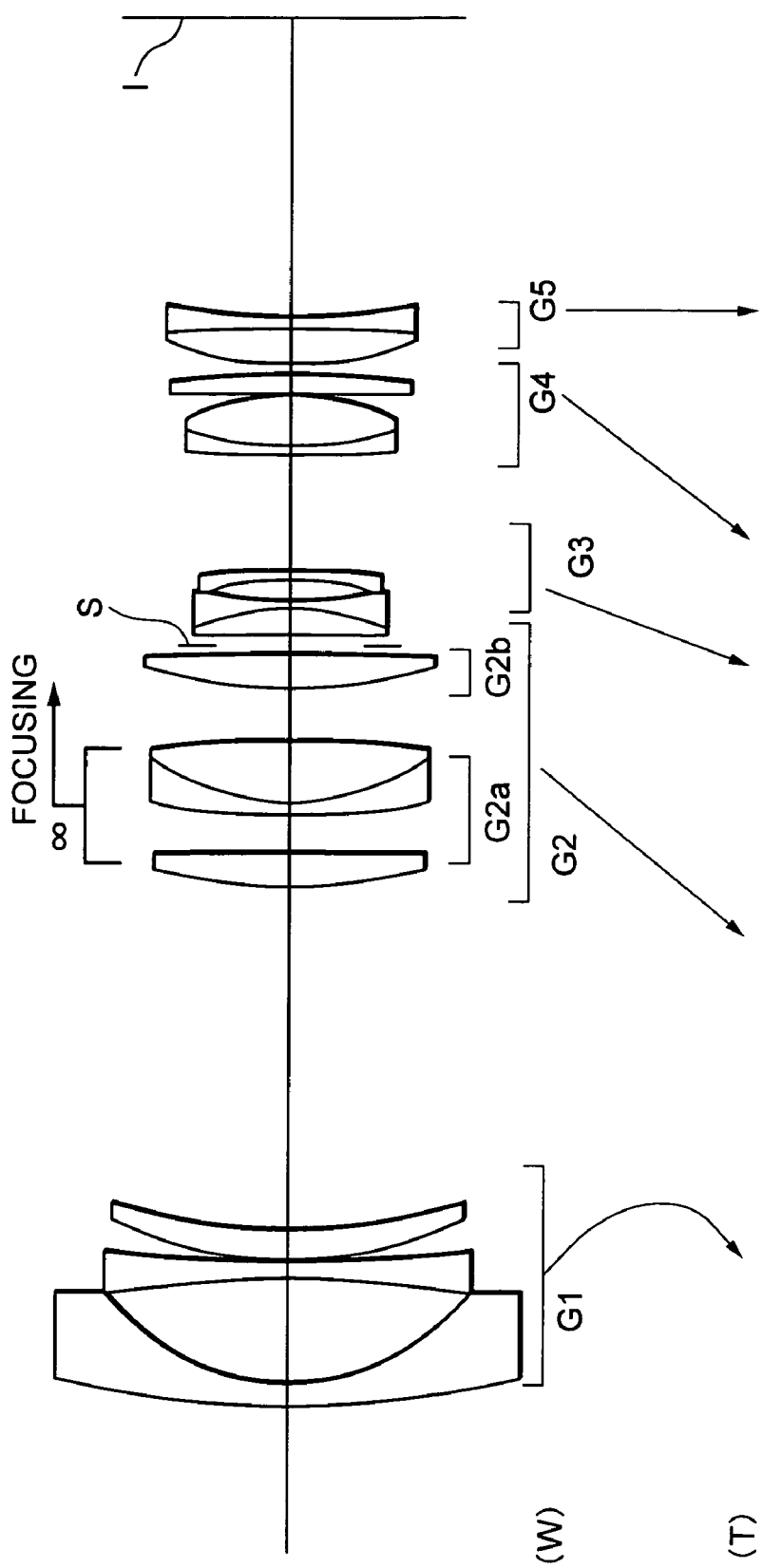

ZOOM LENS SYSTEM

The disclosure of the following priority application is herein incorporated by reference:
Japanese Patent Application No. 2005-282921 filed on Sep. 28, 2005.

BACKGROUND OF THE INVENTION

1. Field of the Invention

The present invention relates to a zoom lens system suitable for a single-lens reflex camera, a digital camera, and the like.

2. Related Background Art

In a fast wide-angle zoom lens system suitable for a single-lens reflex camera, a digital camera, and the like, there are disclosed a four-lens-group zoom lens system and a five-lens-group zoom lens system each having a leading lens group with negative refractive power in Japanese Patent Application Laid-Open Nos. 2001-174704 and 2001-318314.

However, in a four-lens-group zoom lens system having negative-positive-negative-positive power distribution, although an angle of view of 80 degrees or more is accomplished in a wide-angle end state, it has been extremely difficult to correct astigmatism and distortion excellently.

In an example disclosed in Japanese Patent Application Laid-Open No. 2001-174704, although a five-lens-group zoom lens system having a leading lens group with negative refractive power has a fast aperture ratio of about 2.8, the maximum angle of view is merely about 75 degrees.

In an example disclosed in Japanese Patent Application Laid-Open No. 2001-318314, although a five-lens-group zoom lens system having a leading lens group with negative refractive power has the maximum angle of view of 100 degrees or more, the zoom ratio is small about 2.7 and an f-number is merely about 4.

SUMMARY OF THE INVENTION

The present invention is made in view of the aforementioned problems and has an object to provide a zoom lens system that has higher optical performance, a wide maximum angle of view of 80 degrees or more, a zoom ratio of about 2.7, and a fast aperture ratio with an f-number of about 2.8.

According to a first aspect of the present invention, there is provided a zoom lens system including, in order from an object, a first lens group having negative refractive power, a second lens group having positive refractive power, a third lens group having negative refractive power, a fourth lens group having positive refractive power, and a fifth lens group having positive refractive power. When a state of lens group positions varies from a wide-angle end state to a telephoto end state, the first lens group moves at first to an image then to the object, a distance between the first lens group and the second lens group decreases, a distance between the second lens group and the third lens group increases, a distance between the third lens group and the fourth lens group decreases, and a distance between the fourth lens group and the fifth lens group increases.

In the first aspect of the present invention, the following conditional expressions (1) and (2) are preferably satisfied:

$$0.6 < \beta 5 < 0.9 \tag{1}$$

$$S45w/fw < -0.15 \tag{2}$$

where fw denotes a focal length of the zoom lens system in the wide-angle end state, β5 denotes a lateral magnification of the fifth lens group, and S45w denotes a position of the primary principal point of the fifth lens group measured along the optical axis from the secondary principal point of the fourth lens group.

In the first aspect of the present invention, the following conditional expression (3) is preferably satisfied:

$$-1.8 < f1 \times Fnot/ft < -1.0 \tag{3}$$

where Fnot denotes an f-number of the zoom lens system in the telephoto end state, ft denotes a focal length of the zoom lens system in the telephoto end state, and f1 denotes a focal length of the first lens group.

In the first aspect of the present invention, it is preferable that the fifth lens group includes a cemented positive lens constructed by, in order from the object, a positive lens having a convex surface facing the object cemented with a negative lens.

In the first aspect of the present invention, it is preferable that the fourth lens group is composed of, in order from the object, a cemented positive lens constructed by a negative lens cemented with a double convex positive lens, and at least one positive lens.

In the first aspect of the present invention, it is preferable that at least one of the fourth lens group and the fifth lens group has at least one aspherical lens and the aspherical lens has positive refractive power getting weaker from the center to the periphery of the lens.

In the first aspect of the present invention, it is preferable that the second lens group includes at least one aspherical lens and at least one positive lens, and the following conditional expression (4) is preferably satisfied:

$$70 < \nu d \tag{4}$$

where νd denotes Abbe number of the positive lens in the second lens group.

In the first aspect of the present invention, it is preferable that the second lens group is composed of, in order from the object, a front lens group having positive refractive power and a rear lens group having positive refractive power, focusing from infinity to a close object is carried out by moving the front lens group along the optical axis, and the following conditional expression (5) is preferably satisfied:

$$1.1 < f2a/f2b < 1.5 \tag{5}$$

where f2a denotes a focal length of the front lens group, and f2b denotes a focal length of the rear lens group.

In the first aspect of the present invention, it is preferable that the first lens group includes, in order from the object, a negative lens, a negative lens, and a positive lens.

In the first aspect of the present invention, it is preferable that the third lens group includes, in order from the object, a positive lens, a negative lens, and a negative lens.

In the first aspect of the present invention, it is preferable that an aperture stop is disposed to the most object side of the third lens group, and moved with the third lens group in a body upon zooming from the wide-angle end state to the telephoto end state.

In the first aspect of the present invention, it is preferable that the first lens group includes at least one aspherical lens.

In the first aspect of the present invention, it is preferable that the first lens group includes at least one positive lens whose refractive index at d-line is 1.9000 or more.

According to a second aspect of the present invention, there is provided a method for forming an image of an object and varying a focal length of a zoom lens system that includes, in order from the object, a first lens group having negative refractive power, a second lens group having positive refractive power, a third lens group having negative refractive power, a fourth lens group having positive refractive power, and a fifth lens group having positive refractive power, comprising a step of, varying the focal length by moving the first lens group at first to the image and then to the object, decreasing a distance between the first lens group and the second lens group, increasing a distance between the second lens group and the third lens group, decreasing a distance between the third lens group and the fourth lens group, and increasing a distance between the fourth lens group and the fifth lens group when the zoom lens system moves from a wide-angle end state to a telephoto end state.

In the second aspect of the present invention, the following step is preferably included:

satisfying the following conditional expressions (1) and (2): In the second aspect of the present invention, the following step is preferably included:

$$0.6 < \beta 5 < 0.9 \quad (1)$$

$$S45w/fw < -0.15 \quad (2)$$

where fw denotes a focal length of the zoom lens system in the wide-angle end state, β5 denotes a lateral magnification of the fifth lens group, and S45w denotes a position of the primary principal point of the fifth lens group measured along the optical axis from the secondary principal point of the fourth lens group.

In the second aspect of the present invention, the following step is preferably included:

satisfying the following conditional expression (3):

$$-1.8 < f1 \times Fnot/ft < -1.0 \quad (3)$$

where Fnot denotes an f-number of the zoom lens system in the telephoto end state, ft denotes a focal length of the zoom lens system in the telephoto end state, and f1 denotes a focal length of the first lens group.

Other features and advantages according to the present invention will be readily under stood from the detailed description of the preferred embodiments in conjunction with the accompanying drawings.

BRIEF DESCRIPTION OF THE DRAWINGS

FIG. 1 is a diagram showing a lens configuration of a zoom lens system according to Example 1.

FIGS. 2A, 2B, and 2C are graphs showing various aberrations of the zoom lens system according to Example 1 focusing on infinity in which FIG. 2A shows various aberrations in a wide-angle end state W, FIG. 2B shows various aberrations in an intermediate focal length state M, and FIG. 2C shows various aberrations in a telephoto end state T.

FIG. 3 is a diagram showing a lens configuration of a zoom lens system according to Example 2.

FIGS. 4A, 4B, and 4C are graphs showing various aberrations of the zoom lens system according to Example 2 focusing on infinity in which FIG. 4A shows various aberrations in a wide-angle end state W, FIG. 4B shows various aberrations in an intermediate focal length state M, and FIG. 4C shows various aberrations in a telephoto end state T.

FIG. 5 is a diagram showing a lens configuration of a zoom lens system according to Example 3.

FIGS. 6A, 6B, and 6C are graphs showing various aberrations of the zoom lens system according to Example 3 focusing on infinity in which FIG. 6A shows various aberrations in a wide-angle end state W, FIG. 6B shows various aberrations in an intermediate focal length state M, and FIG. 6C shows various aberrations in a telephoto end state W.

FIGS. 8A, 8B, and 8C are graphs showing various aberrations of the zoom lens system according to Example 4 focusing on infinity in which FIG. 8A shows various aberrations in a wide-angle end state W, FIG. 8B shows various aberrations in an intermediate focal length state M, and FIG. 8C shows various aberrations in a telephoto end state T.

DESCRIPTION OF THE MOST PREFERRED EMBODIMENTS

Figure 2A:
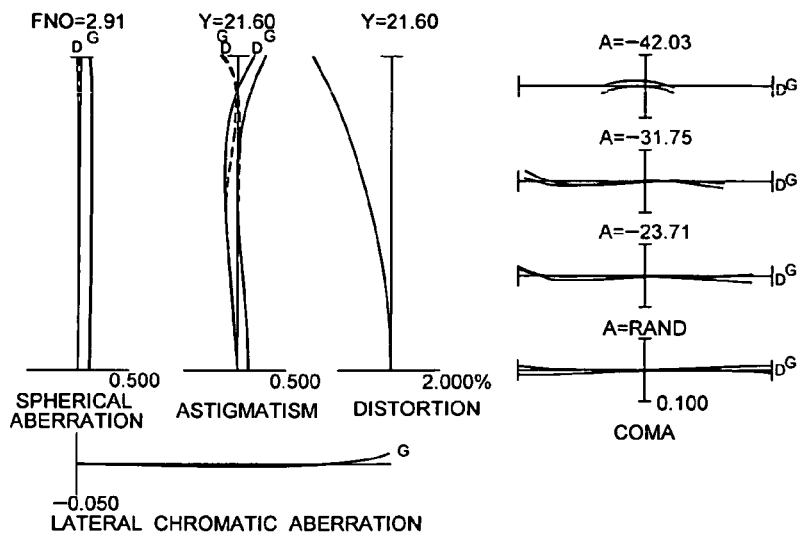

An embodiment according to the present invention is explained below in detail.

A zoom lens system according to the embodiment is composed of, in order from an object, a first lens group having negative refractive power, a second lens group having positive refractive power, a third lens group having negative refractive power, a fourth lens group having positive refractive power, and a fifth lens group having positive refractive power. When a state of lens group positions varies from a wide-angle end state to a telephoto end state, the first lens group moves at first to an image then to the object, a distance between the first lens group and the second lens group decreases, a distance between the second lens group and the third lens group increases, a distance between the third lens group and the fourth lens group decreases, and a distance between the fourth lens group and the fifth lens group increases. The following conditional expressions (1) and (2) are satisfied:

$$0.6 < \beta 5 < 0.9 \quad (1)$$

$$S45w/fw < -0.15 \quad (2)$$

where fw denotes a focal length of the zoom lens system in the wide-angle end state, β5 denotes a lateral magnification of the fifth lens group, and S45w denotes a distance between the secondary principal point of the fourth lens group and the primary principal point of the fifth lens group.

Generally, a multi-lens-group zoom lens system with a leading lens group having negative refractive power is suitable for a fast wide-angle zoom lens system. However, in order to obtain an angle of view of 80 degrees or more, a zoom ratio of about 2.8, and a fast aperture ratio with an f-number of 2.8, a four-lens-group configuration cannot provide sufficient performance. Accordingly, although a lens configuration with five or more lens groups is necessary to be considered, when a lens configuration with six or more lens groups is to be used, a zooming mechanism becomes complicated and bulky. On the other hand, when a five-lens-group configuration is used, and the fifth lens group has negative refractive power, the lateral magnification of the fifth lens group exceeds 1, so that aberrations generated from the first to fourth lens groups are magnified. Accordingly, it becomes difficult to sufficiently correct aberrations under securing the above-described performance.

The embodiment makes it possible to provide a zoom lens system with the above-described performance by making refractive power of the fifth lens group positive and by arranging power distribution of the fifth lens group optimally.

Conditional expression (1) defines an appropriate range of the lateral magnification of the fifth lens group. By making the lateral magnification of the fifth lens group positive and less than 1 as shown in conditional expression (1), a combined focal length combined from the first through fourth lens groups can be shortened by the fifth lens group. Accordingly, the combined focal length combined from the first through fourth lens groups can be longer than that including the fifth lens group. As a result, the combined focal length combined from the first through lens groups can be set longer, so that generation of aberrations can be smaller.

When the value β5 is equal to or exceeds the upper limit of conditional expression (1), refractive power regarding the fifth lens group becomes weak, so that as getting thinner the above-described effect, dependence on the other lens groups becomes large, and it becomes difficult to correct variation in aberrations with good balance from the wide-angle end state to the telephoto end state.

On the other hand, when the value β5 is equal to or falls below the lower limit of conditional expression (1), the focal length of the fifth lens group becomes small, and spherical aberration and coma of the fifth lens group become large, so that it becomes difficult to sufficiently secure expected optical performance and the f-number.

In order to secure the effect of the present invention, it is preferable to set the upper limit of conditional expression (1) to 0.85. In order to secure the effect of the present invention, it is preferable to set the lower limit of conditional expression (1) to 0.75.

Conditional expression (2) defines an appropriate range of the position of the primary principal point of the fifth lens group measured along the optical axis from the secondary principal point of the fourth lens group. As shown in conditional expression (2), it is preferable that the position of the primary principal point of the fifth lens group measured along the optical axis from the secondary principal point of the fourth lens group is brought closer to the object side as much as possible. With this arrangement, the focal lengths of the fourth lens group and the fifth lens group, which are necessary to obtain the lateral magnification of conditional expression (1), can be set to longer values, and spherical aberration generated in the fifth lens group and coma in the wide-angle end state can be lowered, so that an expected wide angle of view, a high zoom ratio, a fast aperture ratio, and high optical performance can be obtained.

In order to secure the effect of the present invention, it is preferable to set the upper limit of conditional expression (2) to −0.3.

In a zoom lens system according to the embodiment, the following conditional expression (3) is preferably satisfied:

$$-1.8 < f1 \times Fnot/ft < -1.0 \quad (3)$$

where Fnot denotes an f-number of the zoom lens system in the telephoto end state, ft denotes a focal length of the zoom lens system in the telephoto end state, and f1 denotes a focal length of the first lens group.

Conditional expression (3) defines an appropriate range of the focal length of the first lens group.

When the value f1×Fnot/ft is equal to or exceeds the upper limit of conditional expression (3), refractive power of the first lens group becomes large. Although it is advantageous for making the outer diameter of the lens compact and for securing a back focal length, it becomes difficult to correct coma and distortion in the wide-angle end state and spherical aberration and coma in the telephoto end state with good balance.

On the other hand, when the value f1×Fnot/ft is equal to or falls below the lower limit of conditional expression (3), the outer diameter of the lens becomes large, so that it is undesirable. Moreover, distortion and coma becomes worse, so that it becomes impossible to obtain high optical performance.

In order to secure the effect of the present invention, it is preferable to set the upper limit of conditional expression (3) to −1.3. In order to secure the effect of the present invention, it is preferable to set the lower limit of conditional expression (3) to −1.7.

In a zoom lens system according to the embodiment, it is preferable that the fifth lens group include a cemented positive lens constructed by, in order from the object, a positive lens having a convex surface facing the object cemented with a negative lens.

In the fifth lens group, with using the configuration including a cemented positive lens constructed by, in order from the object, a positive lens having a convex surface facing the object cemented with a negative lens, there are various advantages over conventional configuration including a cemented positive lens constructed by, in order from the object, a negative lens cemented with a positive lens, which is found regularly. By using the configuration including, in order from the object, a positive lens and a negative lens, which is a so-called telephoto type, it becomes easy to bring the position of the primary principal point of the fifth lens group closer to the object, so that it becomes easy to satisfy conditional expression (2). By arranging the negative lens to the image side in the fifth lens group, an effect to correct an amount of under correction of distortion in the wide-angle side generated by applying negative refractive power in the first lens group and an effect of correcting variation in image plane upon zooming can be expected. In view of peripheral quantity of light, an effect of lowering the height of a peripheral ray on the positive lens in the fifth lens group becomes strong, so that it becomes advantageous to make the lens diameter smaller.

In a zoom lens system according to the embodiment, it is preferable that the fourth lens group is composed of, in order from the object, a cemented positive lens constructed by a negative lens cemented with a double convex positive lens, and at least one positive lens.

With constructing the fourth lens group by, in order from the object, a cemented positive lens constructed by a negative lens cemented with a double convex positive lens, and at least one positive lens, there are various advantages over a construction composed of a cemented positive lens constructed by, in order from the object, a positive lens cemented with a negative lens, which is found regularly.

Contrary to the case of the fifth lens group, the fourth lens group is composed of, in order from the object, a negative lens, a positive lens, and a positive lens, which is a so-called retro-focus type. Accordingly, it becomes easy to bring the secondary principal point of the fourth lens group closer to the image side, so that it becomes easy to satisfy conditional expression (2). An optical system combined the fourth and fifth lens groups as a whole becomes a symmetrical optical system which has a negative lens at each end thereof, and becomes a lens system suitable for a wide angle of view. This is a lens type frequently used for an eyepiece lens system which is required to have a wide angle of view and a flatness of field. With this construction, the substantially parallel light flux come out from the third lens group can be converged onto the image plane hardly generating any aberration.

In a zoom lens system according to the embodiment, it is preferable that at least one of the fourth lens group and the fifth lens group has at least one aspherical lens, and the aspherical lens has positive refractive power getting weaker from the center to the periphery of the lens.

By including an aspherical surface in a positive lens in the fourth lens group or the fifth lens group, aberrations, in particular, coma and distortion in the peripheral image height and spherical aberration can be effectively corrected.

In a zoom lens system according to the embodiment, it is preferable that the second lens group has at least one aspherical lens and at least one positive lens. The following conditional expression (4) is preferably satisfied:

$$70 < \nu d \qquad (4)$$

where νd denotes Abbe number of the positive lens in the second lens group at d-line (wavelength λ=587.6 nm).

Conditional expression (4) defines a configuration of the second lens group. In a zoom lens system whose first lens group has negative refractive power, since the marginal ray, which is the highest incident ray among the incident rays parallel to the optical axis, becomes highest in the second lens group, it has a great influence on spherical aberration and longitudinal chromatic aberration. Accordingly, when a positive lens satisfying conditional expression (4) is used, longitudinal chromatic aberration can be excellently corrected. However, a glass material satisfying conditional expression (4) usually has low refractive index, so that correction of spherical aberration has been liable to become undercorrection. Therefore, by using an aspherical surface in the second lens group in combination with conditional expression (4), it becomes possible to excellently correct longitudinal chromatic aberration and spherical aberration at the same time.

In order to secure the effect of the present invention, it is preferable to set the lower limit of conditional expression (4) to 80.

In a zoom lens system according to the embodiment, it is preferable that the second lens group is composed of, in order from the object, a front lens group having positive refractive power, and a rear lens group having positive refractive power, focusing from infinity to a close object is carried out by moving the front lens group along the optical axis, and the following conditional expression (5) is preferably satisfied:

$$1.1 < f2a/f2b < 1.5 \qquad (5)$$

where f2a denotes a focal length of the front lens group, and f2b denotes a focal length of the rear lens group.

Conditional expression (5) defines an appropriate range of a ratio of the focal length of the front lens group to that of the rear lens group in the second lens group.

When the ratio f2a/f2b is equal to or falls below the lower limit of conditional expression (5), since difference between a moving amount of the front lens group upon focusing in the wide-angle end state and that in the telephoto end state becomes large, a space necessary for focusing becomes large, and the whole zoom lens system becomes large, so that it is undesirable. Moreover, variation in spherical aberration upon focusing becomes large, so that high optical performance cannot be obtained.

On the other hand, when the ratio f2a/f2b is equal to or exceeds the upper limit of conditional expression (5), since difference between a moving amount of the front lens group upon focusing in the wide-angle end state and that in the telephoto end state becomes large, a space necessary for focusing becomes large, and the whole zoom lens system becomes large, so that it is undesirable. Moreover, spherical aberration becomes worse, so that high optical performance cannot be obtained.

In order to secure the effect of the present invention, it is preferable to set the upper limit of conditional expression (5) to 1.4. In order to further secure the effect of the present invention, it is preferable to set the lower limit of conditional expression (5) to 1.15.

Each Example of a zoom lens system according to the embodiment will be explained below with reference to accompanying drawings.

In each example, an aspherical surface is exhibited by the following expression:

$$X(y) = (y^2/r)/[1+[1-\kappa(y^2/r^2)]^{1/2}] + C4 \times y^4 + C6 \times y^6 + C8 \times y^8 + C10 \times y^{10} + C12 \times y^{12}$$

where y denotes a vertical height from the optical axis, X(y) denotes a sag amount at a height y, r denotes a radius of curvature of a reference sphere (a paraxial radius of curvature), κ denotes a conical coefficient, and Cn denotes aspherical coefficient of n-th order. The position of an aspherical surface is expressed by attaching "*" to the right side of the surface number in [Lens Data].

EXAMPLE 1

FIG. 1 is a diagram showing a lens configuration of a zoom lens system according to Example 1.

In FIG. 1, the zoom lens system according to Example 1 is composed of, in order from an object, a first lens group G1 having negative refractive power, a second lens group G2 having positive refractive power, a third lens group G3 having negative refractive power, a fourth lens group G4 having positive refractive power, and a fifth lens group G5 having positive refractive power. When a state of lens group positions varies from a wide-angle end state W to a telephoto end state T, the first lens group G1 moves at first to an image and then to the object, the second lens group G2, the third lens group G3, and the fourth lens group G4 move to the object, and the fifth lens group is fixed.

The first lens group G1 is composed of, in order from the object, a negative meniscus lens having a convex surface facing the object and an aspherical surface facing the image plane I side, a double concave negative lens, and a positive meniscus lens having a convex surface facing the object.

The second lens group G2 is composed of a front lens group G2a having positive refractive power, and a rear lens group G2b having positive refractive power. The front lens group G2a is composed of, in order from the object, a double convex positive lens having an aspherical surface facing the object, and a cemented lens constructed by a negative meniscus lens having a convex surface facing the object cemented with a double convex positive lens. The rear lens group G2b is composed of a double convex positive lens.

The third lens group G3 is composed of, in order from the object, a cemented lens constructed by a positive meniscus lens having a concave surface facing the object cemented with a double concave negative lens, and a negative meniscus lens having a concave surface facing the object.

The fourth lens group G4 is composed of, in order from the object, a cemented lens constructed by a negative meniscus lens having a convex surface facing the object cemented with a double convex positive lens, and a double convex positive lens having an aspherical surface facing the image plane I side.

The fifth lens group G5 is composed of a cemented lens constructed by, in order from the object, a positive meniscus lens having a convex surface facing the object cemented with a negative meniscus lens having a convex surface facing the object.

Focusing from infinity to a close object is carried out by moving the front lens group G2a to the image plane I side. An aperture stop S is disposed to the most object side of the third lens group G3, and moved with the third lens group in a body upon zooming from the wide-angle end state W to the telephoto end state T.

Various values of the zoom lens system according to Example 1 are listed in Table 1. In [Specifications], f denotes the focal length, FNO denotes the f-number, and 2ω denotes an angle of view (unit: degrees). In [Lens Data], the left most column shows the lens surface number counted in order from the object side, the second column "r" shows a radius of curvature of the lens surface, the third column "d" shows a distance to the next lens surface, the fourth column "νd" shows Abbe number of the medium at d-line (wavelength λ=587.6 nm), and the fifth column "nd" shows refractive index of the medium at d-line (wavelength λ=587.6 nm). In [Aspherical Data], "κ" denotes a conical coefficient, "Ci" denotes an i-th order aspherical coefficient. "E-n" denotes "$10^{-n}$". In [Variable Distances], the focal length f and variable distances in the wide-angle end state W, in an intermediate focal length state M, and in telephoto end state T are shown, respectively. In [Values for Conditional Expressions], values for respective conditional expressions are shown. In the radius of curvature, $r=\infty$ means a plane surface. Refractive index of the air nd=1.000000 is omitted.

In the tables for various values, "mm" is generally used for the unit of length such as the focal length, the radius of curvature, and the distance to the next lens surface. However, since an optical system proportionally enlarged or reduced its dimension can be obtained similar optical performance, the unit is not necessary to be limited to "mm", and any other suitable unit can be used. The explanation of reference symbols is the same in the other examples, so that duplicated explanations are omitted.

TABLE 1

[Specifications]

|  | W | T |
|---|---|---|
| f = | 24.78 | 67.7 |
| FNO = | 2.91 | |
| 2ω = | 82.2 | 35.4° |

[Lens Data]

| | r | d | νd | nd |
|---|---|---|---|---|
| 1 | 148.55 | 3.20 | 49.5 | 1.744429 |
| 2* | 26.69 | 15.05 | | |
| 3 | −140.00 | 2.20 | 63.3 | 1.618000 |
| 4 | 170.00 | 0.20 | | |
| 5 | 59.74 | 4.00 | 23.1 | 1.860740 |
| 6 | 96.63 | (d6) | | |
| 7* | 58.54 | 0.09 | 38.1 | 1.553890 |
| 8 | 60.61 | 5.13 | 46.6 | 1.816000 |
| 9 | −4381.42 | 8.35 | 37.6 | |
| 10 | 79.18 | 1.54 | 23.8 | 1.846660 |
| 11 | 30.73 | 8.00 | 91.2 | 1.456000 |
| 12 | −637.46 | (d12) | | |
| 13 | 59.59 | 4.84 | 40.8 | 1.882997 |
| 14 | −925.95 | (d14) | | |
| 15 | ∞ | 1.65 | Aperture Stop S | |
| 16 | −468.53 | 3.00 | 23.1 | 1.860740 |
| 17 | −41.13 | 1.15 | 54.7 | 1.729157 |
| 18 | 58.99 | 3.13 | | |
| 19 | −40.45 | 1.15 | 54.7 | 1.729157 |
| 20 | −129.43 | (d20) | | |
| 21 | 249.89 | 1.20 | 23.8 | 1.846660 |
| 22 | 61.26 | 6.50 | 81.6 | 1.497000 |
| 23 | −33.18 | 0.20 | | |
| 24 | 499.94 | 3.25 | 81.4 | 1.495500 |
| 25* | −150.00 | (d25) | | |
| 26 | 37.97 | 4.80 | 81.5 | 1.496999 |
| 27 | 337.67 | 1.40 | 25.4 | 1.805181 |
| 28 | 69.31 | Bf | | |

TABLE 1-continued

[Aspherical Data]

Surface Number 2

κ = −1.8970E−01
C4 = 3.9947E−06
C6 = −1.0319E−09
C8 = 7.4218E−12
C10 = −1.0720E−14
C12 = 6.8060E−18

Surface Number 7

κ = −2.2290E−01
C4 = −1.1042E−07
C6 = −4.2572E−10
C8 = 2.1178E−12
C10 = −2.0591E−15
C12 = 0.0000

Surface Number 25

κ = −9.5432E+00
C4 = 3.2539E−06
C6 = 1.1325E−09
C8 = 4.9837E−12
C10 = −8.3197E−15
C12 = 0.0000

[Variable Distances]

| | W | M | T |
|---|---|---|---|
| f | 24.78 | 51.92 | 67.70 |
| d6 | 48.16 | 9.18 | 1.85 |
| d12 | 7.59 | 7.59 | 7.59 |
| d14 | 1.35 | 20.98 | 28.94 |
| d20 | 16.60 | 6.77 | 1.60 |
| d25 | 1.50 | 14.05 | 24.18 |

[Values for Conditional Expressions]

(1): β5 = 0.82
(2): S45w/fw = −0.47
(3): fl × Fnot/ft = −1.64
(4): νd = 91.2
(5): f2a/f2b = 1.21

Figure 2B:
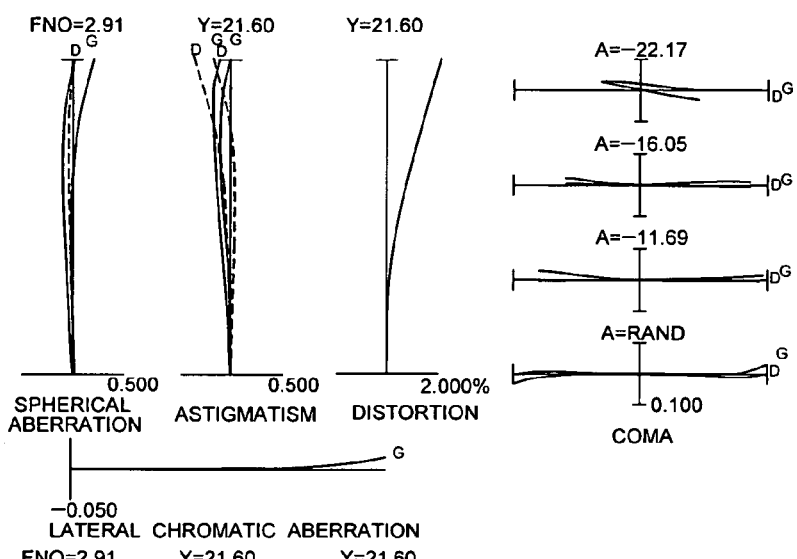
Figure 2C:
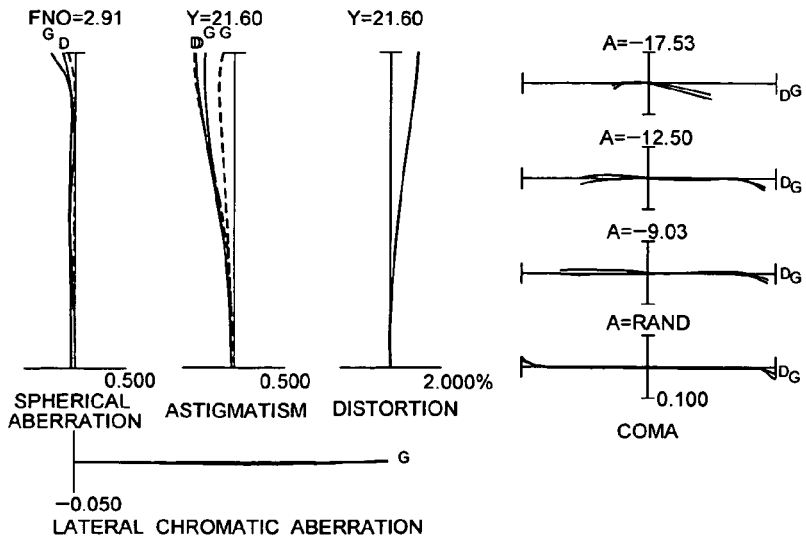

FIGS. 2A, 2B, and 2C are graphs showing various aberrations of the zoom lens system according to Example 1 focusing on infinity in which FIG. 2A shows various aberrations in a wide-angle end state W, FIG. 2B shows various aberrations in an intermediate focal length state M, and FIG. 2C shows various aberrations in a telephoto end state T.

In respective graphs, FNO denotes an f-number, Y denotes an image height, A denotes an incident angle of a principal ray, D denotes aberration curve at d-line (wavelength λ=587.6 nm), and G denotes aberration curve at g-line (wavelength λ=435.8 nm). In the graph showing astigmatism, a solid line indicates a sagittal image plane, and a broken line indicates a meridional image plane. In the graphs showing spherical aberration, a solid line indicates spherical aberration, and a broken line indicates sine condition. In graphs showing lateral chromatic aberration, showing lateral chromatic aberration at g-line with respect to that at d-line is shown. The above-described explanation regarding various aberration graphs is the same as the other examples.

As is apparent from the respective graphs, the zoom lens system according to Example 1 shows superb optical performance as a result of good corrections to various aberrations in each focal length state.

EXAMPLE 2

FIG. 3 is a diagram showing a lens configuration of a zoom lens system according to Example 2.

In FIG. 3, the zoom lens system according to Example 2 is composed of, in order from an object, a first lens group G1 having negative refractive power, a second lens group G2 having positive refractive power, a third lens group G3 having negative refractive power, a fourth lens group G4 having positive refractive power, and a fifth lens group G5 having positive refractive power. When a state of lens group positions varies from a wide-angle end state W to a telephoto end state T, the first lens group G1 moves at first to an image and then to the object, the second lens group G2, the third lens group G3, and the fourth lens group G4 move to the object, and the fifth lens group is fixed.

The first lens group G1 is composed of, in order from the object, a negative meniscus lens having a convex surface facing the object and an aspherical surface facing the image plane I side, a double concave negative lens, and a positive meniscus lens having a convex surface facing the object.

The second lens group G2 is composed of a front lens group G2a having positive refractive power, and a rear lens group G2b having positive refractive power. The front lens group G2a is composed of, in order from the object, a double convex positive lens having an aspherical surface facing the object, and a cemented lens constructed by a negative meniscus lens having a convex surface facing the object cemented with a double convex positive lens. The rear lens group G2b is composed of a double convex positive lens.

The third lens group G3 is composed of, in order from the object, a cemented lens constructed by a positive meniscus lens having a concave surface facing the object cemented with a double concave negative lens, and a negative meniscus lens having a concave surface facing the object.

The fourth lens group G4 is composed of, in order from the object, a cemented lens constructed by a negative meniscus lens having a convex surface facing the object cemented with a double convex positive lens, and a double convex positive lens having an aspherical surface facing the image plane I side.

The fifth lens group G5 is composed of a cemented lens constructed by, in order from the object, a positive meniscus lens having a convex surface facing the object cemented with a negative meniscus lens having a convex surface facing the object.

Focusing from infinity to a close object is carried out by moving the front lens group G2a to the image plane I side. An aperture stop S is disposed to the most object side of the third lens group G3 and moved with the third lens group in a body upon zooming from the wide-angle end state W to the telephoto end state T.

Various values of the zoom lens system according to Example 2 are listed in Table 2.

TABLE 2

[Specifications]

|  | W | T |
| --- | --- | --- |
| f = | 24.78 | 67.7 |
| FNO = | 2.91 |  |
| 2ω = | 82.2 | 35.4° |

TABLE 2-continued

[Lens Data]

| | r | d | νd | nd |
| --- | --- | --- | --- | --- |
| 1 | 125.62 | 3.20 | 49.52 | 1.744429 |
| 2* | 26.88 | 14.95 | | |
| 3 | −140.00 | 2.20 | 63.33 | 1.618000 |
| 4 | 164.53 | 0.20 | | |
| 5 | 53.97 | 4.00 | 23.78 | 1.846660 |
| 6 | 75.60 | (d6) | | |
| 7* | 59.74 | 0.10 | 38.09 | 1.553890 |
| 8 | 62.41 | 5.0 | 49.60 | 1.772499 |
| 9 | −762.32 | 6.00 | | |
| 10 | 113.72 | 1.50 | 26.52 | 1.761821 |
| 11 | 30.03 | 8.30 | 82.56 | 1.497820 |
| 12 | −315.20 | (d12) | | |
| 13 | 60.55 | 4.84 | 40.76 | 1.882997 |
| 14 | −474.60 | (d14) | | |
| 15 | ∞ | 1.65 | Aperture Stop S | |
| 16 | −1292.82 | 3.05 | 23.78 | 1.846660 |
| 17 | −36.86 | 1.15 | 54.68 | 1.729157 |
| 18 | 54.86 | 3.30 | | |
| 19 | −39.10 | 1.15 | 54.68 | 1.729157 |
| 20 | −139.40 | (d20) | | |
| 21 | 285.08 | 1.20 | 25.42 | 1.805181 |
| 22 | 46.73 | 7.11 | 82.56 | 1.497820 |
| 23 | −32.76 | 0.20 | | |
| 24 | 508.57 | 2.80 | 64.14 | 1.516330 |
| 25* | −127.81 | (d25) | | |
| 26 | 39.24 | 5.05 | 82.56 | 1.497820 |
| 27 | 599.11 | 1.40 | 25.42 | 1.805181 |
| 28 | 74.82 | Bf | | |

[Aspherical Data]

Surface Number 2

κ = −0.1438
C4 = 3.8749E−06
C6 = −2.2610E−10
C8 = 6.0954E−12
C10 = −8.9785E−15
C12 = 6.529E−18

Surface Number 7

κ = −0.4588
C4 = −2.4347E−07
C6 = −1.2907E−10
C8 = 1.7953E−12
C10 = −1.9730E−15
C12 = 0.0000

Surface Number 25

κ = 13.3795
C4 = 3.3574E−06
C6 = 3.1407E−09
C8 = −8.1398E−12
C10 = 1.4058E−14
C12 = 0.0000

[Variable Distances]

| | W | M | T |
| --- | --- | --- | --- |
| f | 24.78 | 51.92 | 67.70 |
| d6 | 47.46 | 9.09 | 1.87 |
| d12 | 7.35 | 7.35 | 7.35 |
| d14 | 1.35 | 19.10 | 26.58 |
| d20 | 16.24 | 6.48 | 1.60 |
| d25 | 1.40 | 14.23 | 23.79 |

[Values for Conditional Expressions]

(1): β5 = 0.82
(2): S45w/fw = −0.50
(3): f1 × Fnot/ft = −1.62
(4): νd = 82.6
(5): f2a/f2b = 1.23

Figure 4A:
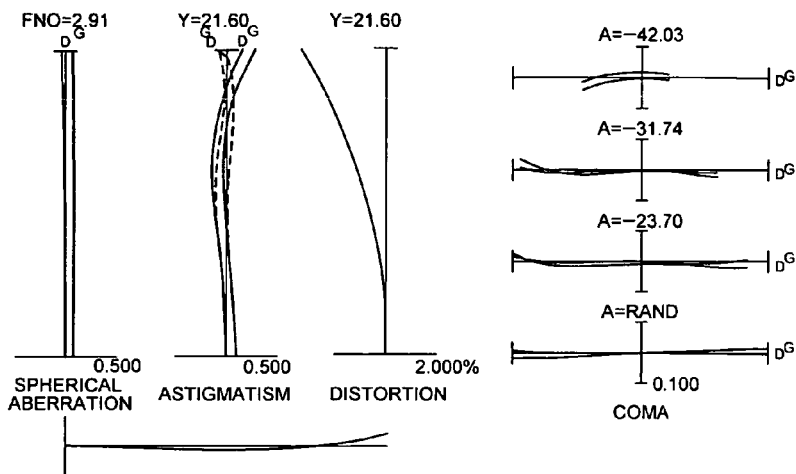
Figure 4B:
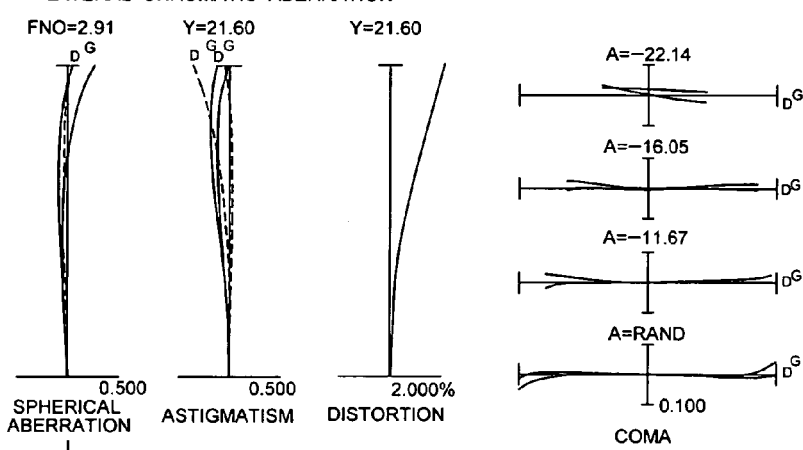
Figure 4C:
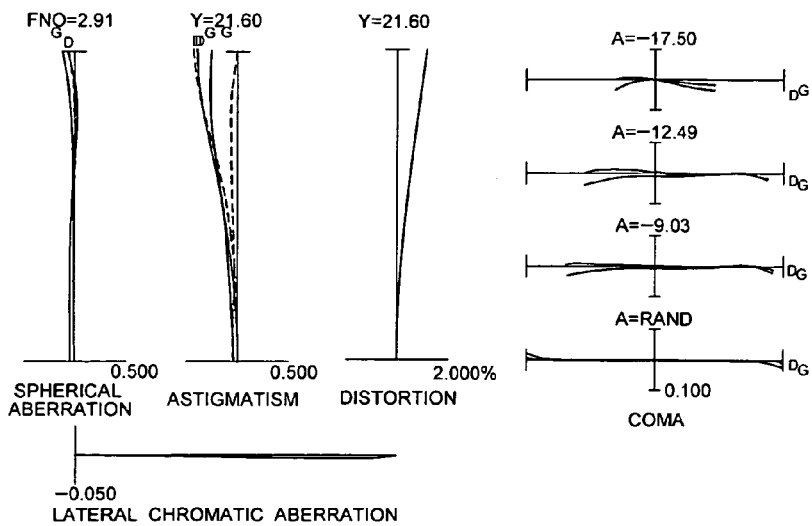

FIGS. 4A, 4B, and 4C are graphs showing various aberrations of the zoom lens system according to Example 2 focusing on infinity in which FIG. 4A shows various aberrations in a wide-angle end state W, FIG. 4B shows various aberrations in an intermediate focal length state M, and FIG. 4C shows various aberrations in a telephoto end state T.

As is apparent from the respective graphs, the zoom lens system according to Example 2 shows superb optical performance as a result of good corrections to various aberrations in each focal length state.

EXAMPLE 3

FIG. 5 is a diagram showing a lens configuration of a zoom lens system according to Example 3.

In FIG. 5, the zoom lens system according to Example 3 is composed of, in order from an object, a first lens group G1 having negative refractive power, a second lens group G2 having positive refractive power, a third lens group G3 having negative refractive power, a fourth lens group G4 having positive refractive power, and a fifth lens group G5 having positive refractive power. When a state of lens group positions varies from a wide-angle end state W to a telephoto end state T, the first lens group G1 moves at first to an image and then to the object, the second lens group G2, the third lens group G3, and the fourth lens group G4 move to the object, and the fifth lens group is fixed.

The first lens group G1 is composed of, in order from the object, a negative meniscus lens having a convex surface facing the object and an aspherical surface facing the image plane I side, a double concave negative lens, and a positive meniscus lens having a convex surface facing the object.

The second lens group G2 is composed of a front lens group G2a having positive refractive power, and a rear lens group G2b having positive refractive power. The front lens group G2a is composed of, in order from the object, a double convex positive lens having an aspherical surface facing the object, and a cemented lens constructed by a negative meniscus lens having a convex surface facing the object cemented with a double convex positive lens. The rear lens group G2b is composed of a double convex positive lens.

The third lens group G3 is composed of, in order from the object, a cemented lens constructed by a positive meniscus lens having a concave surface facing the object cemented with a double concave negative lens, and a negative meniscus lens having a concave surface facing the object.

The fourth lens group G4 is composed of, in order from the object, a cemented lens constructed by a negative meniscus lens having a convex surface facing the object cemented with a double convex positive lens, and a positive meniscus lens having a concave surface facing the object and an aspherical surface facing the image plane I side.

The fifth lens group G5 is composed of a cemented lens constructed by, in order from the object, a double convex positive lens cemented with a double concave negative lens.

Focusing from infinity to a close object is carried out by moving the front lens group G2a to the image plane I side. An aperture stop S is disposed to the most object side of the third lens group G3 and moved with the third lens group in a body upon zooming from the wide-angle end state W to the telephoto end state T.

Various values of the zoom lens system according to Example 3 are listed in Table 3.

TABLE 3

[Specifications]

|  | W | T |
|---|---|---|
| f = | 24.78 | 67.7 |
| FNO = | 2.92 |  |
| 2ω = | 82.2 | 35.4° |

[Lens Data]

|  | r | d | νd | nd |
|---|---|---|---|---|
| 1 | 124.77 | 3.00 | 49.52 | 1.744429 |
| 2* | 27.48 | 14.50 |  |  |
| 3 | −140.00 | 2.20 | 63.33 | 1.618000 |
| 4 | 170.00 | 0.20 |  |  |
| 5 | 52.25 | 4.00 | 23.78 | 1.846660 |
| 6 | 69.81 | (d6) |  |  |
| 7* | 60.50 | 0.10 | 38.09 | 1.553890 |
| 8 | 63.21 | 4.78 | 49.60 | 1.772499 |
| 9 | 12779.25 | 5.4000 |  |  |
| 10 | 111.76 | 1.75 | 26.52 | 1.761821 |
| 11 | 30.78 | 8.40 | 82.56 | 1.497820 |
| 12 | −209.11 | (d12) |  |  |
| 13 | 61.32 | 4.70 | 40.76 | 1.882997 |
| 14 | −438.25 | (d14) |  |  |
| 15 | ∞ | 1.65 | Aperture Stop S | |
| 16 | −669.73 | 3.40 | 23.78 | 1.846660 |
| 17 | −36.02 | 1.10 | 55.53 | 1.696797 |
| 18 | 60.85 | 3.05 |  |  |
| 19 | −42.21 | 1.05 | 54.68 | 1.729157 |
| 20 | −274.34 | (d20) |  |  |
| 21 | 234.05 | 1.10 | 25.42 | 1.805181 |
| 22 | 42.64 | 7.14 | 82.56 | 1.497820 |
| 23 | −33.19 | 0.20 |  |  |
| 24 | −605.58 | 2.50 | 49.60 | 1.772499 |
| 25 | −136.80 | 0.08 | 38.09 | 1.553890 |
| 26* | −130.93 | (d26) |  |  |
| 27 | 40.74 | 5.15 | 82.56 | 1.49782 |
| 28 | −910.23 | 1.40 | 25.42 | 1.805181 |
| 29 | 87.90 | Bf |  |  |

[Aspherical Data]

Surface Number 2

$\kappa = -1.5280E-01$
$C4 = 3.7704E-06$
$C6 = -5.3623E-10$
$C8 = 6.7695E-12$
$C10 = -1.0431E-14$
$C12 = 7.4566E-18$ Surface Number 7

$\kappa = -1.8520E-01$
$C4 = -4.3765E-07$
$C6 = -2.3315E-10$
$C8 = 2.3862E-12$
$C10 = -2.8617E-15$
$C12 = 0.0000$ Surface Number 26

$\kappa = 1.1437E+01$
$C4 = 2.8992E-06$
$C6 = 3.8341E-09$
$C8 = -1.2929E-11$
$C10 = 2.1850E-14$
$C12 = 0.0000$

[Variable Distances]

|  | W | M | T |
|---|---|---|---|
| f | 24.78 | 52.00 | 67.70 |
| d6 | 48.09 | 9.21 | 1.85 |
| d12 | 7.53 | 7.53 | 7.53 |
| d14 | 1.35 | 18.90 | 26.53 |

TABLE 3-continued

| | | | |
|---|---|---|---|
| d20 | 16.45 | 6.51 | 1.60 |
| d26 | 1.30 | 14.47 | 23.86 |

[Values for Conditional Expressions]

(1): $\beta 5 = 0.82$
(2): S45w/fw = −0.44
(3): f1 × Fnot/ft = −1.65
(4): νd = 82.6
(5): f2a/f2b = 1.25

Figure 6A:
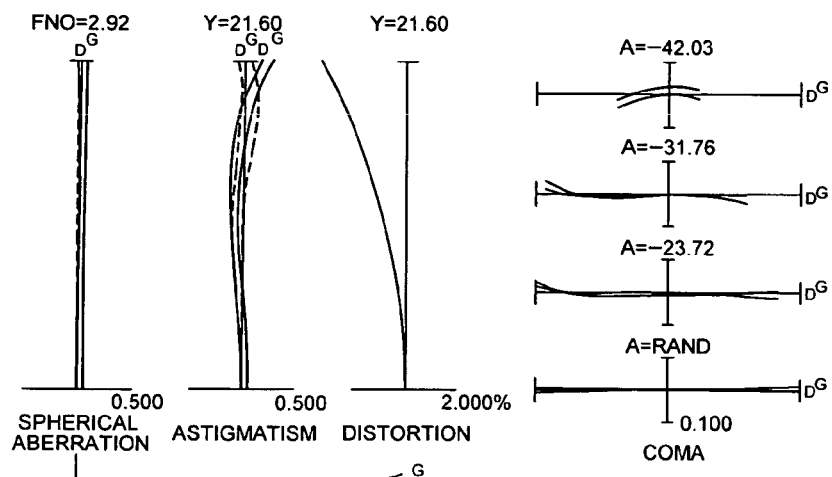
Figure 6B:
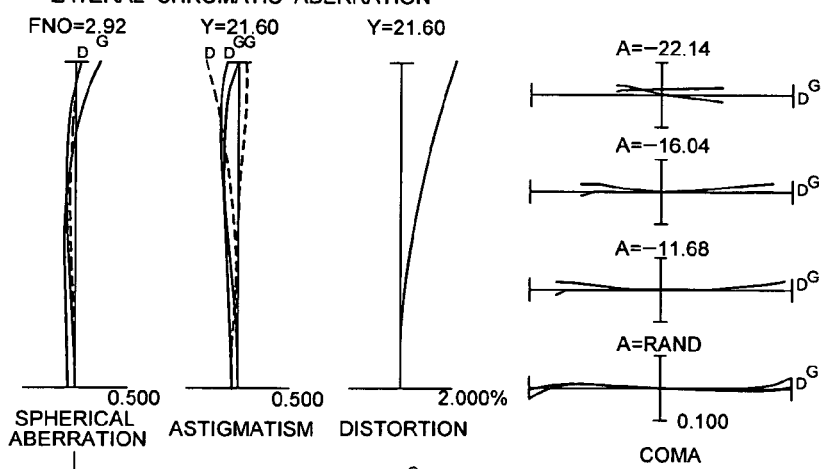
Figure 6C:
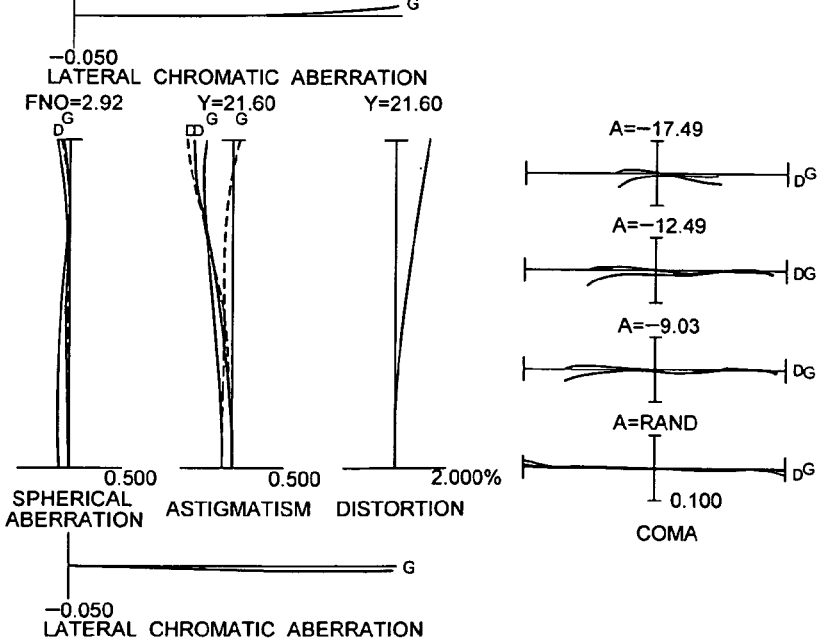

FIGS. 6A, 6B, and 6C are graphs showing various aberrations of the zoom lens system according to Example 3 focusing on infinity in which FIG. 6A shows various aberrations in a wide-angle end state W, FIG. 6B shows various aberrations in an intermediate focal length state M, and FIG. 6C shows various aberrations in a telephoto end state W.

As is apparent from the respective graphs, the zoom lens system according to Example 3 shows superb optical performance as a result of good corrections to various aberrations in each focal length state.

EXAMPLE 4

Figure 7:
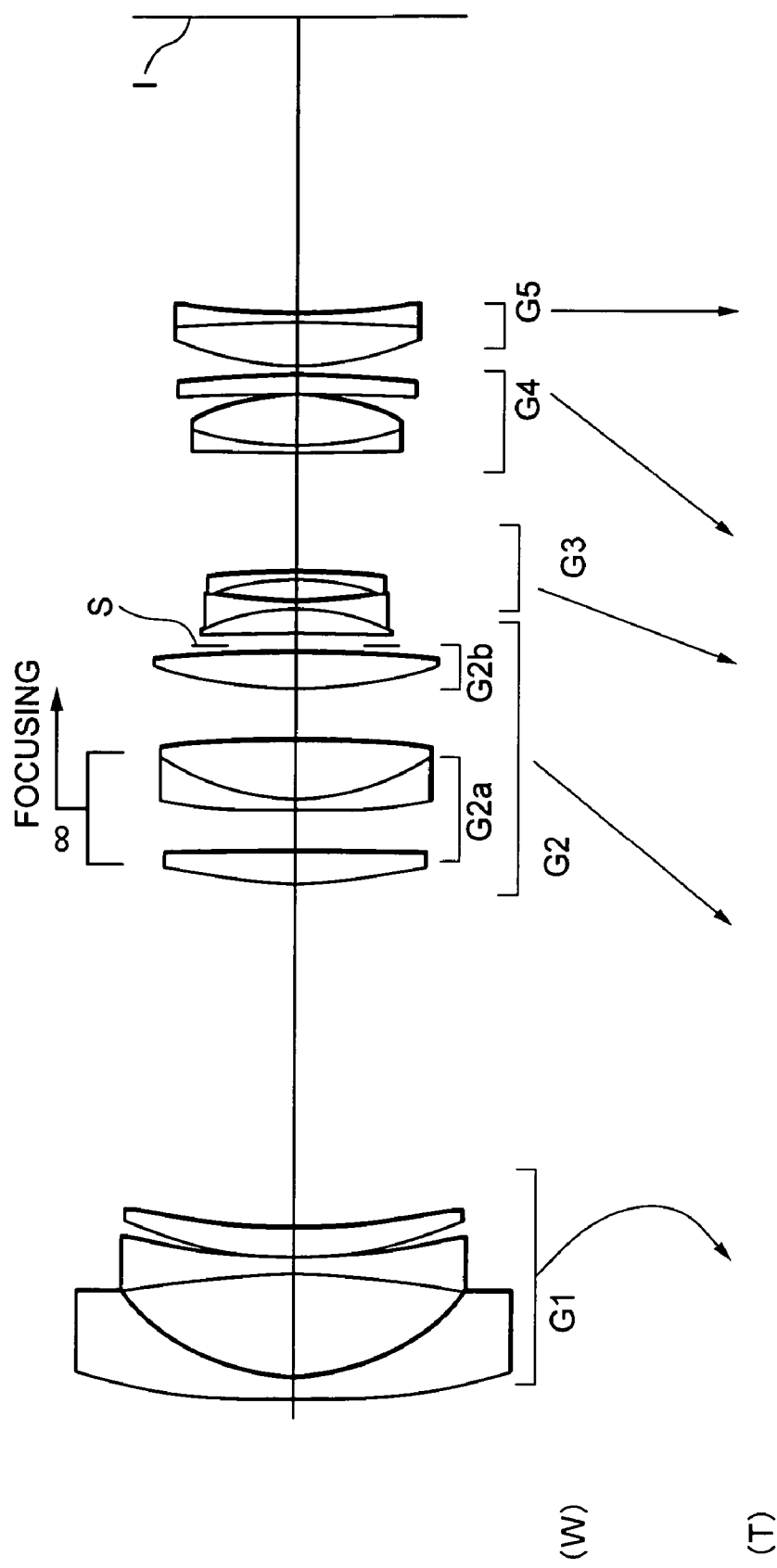
FIG. 7 is a diagram showing a lens configuration of a zoom lens system according to Example 4.

FIG. 7 is a diagram showing a lens configuration of a zoom lens system according to Example 4.

In FIG. 7, the zoom lens system according to Example 4 is composed of, in order from an object, a first lens group G1 having negative refractive power, a second lens group G2 having positive refractive power, a third lens group G3 having negative refractive power, a fourth lens group G4 having positive refractive power, and a fifth lens group G5 having positive refractive power. When a state of lens group positions varies from a wide-angle end state W to a telephoto end state T, the first lens group G1 moves at first to an image and then to the object, the second lens group G2, the third lens group G3, and the fourth lens group G4 move to the object, and the fifth lens group is fixed.

The first lens group G1 is composed of, in order from the object, a negative meniscus lens having a convex surface facing the object and an aspherical surface facing the image plane I side, a double concave negative lens, and a positive meniscus lens having a convex surface facing the object.

The second lens group G2 is composed of a front lens group G2a having positive refractive power, and a rear lens group G2b having positive refractive power. The front lens group G2a is composed of, in order from the object, a double convex positive lens having an aspherical surface facing the object, and a cemented lens constructed by a negative meniscus lens having a convex surface facing the object cemented with a double convex positive lens. The rear lens group G2b is composed of a double convex positive lens.

The third lens group G3 is composed of, in order from the object, a cemented lens constructed by a positive meniscus lens having a concave surface facing the object cemented with a double concave negative lens, and a negative meniscus lens having a concave surface facing the object.

The fourth lens group G4 is composed of, in order from the object, a cemented lens constructed by a negative meniscus lens having a convex surface facing the object cemented with a double convex positive lens, and a positive meniscus lens having a concave surface facing the object and an aspherical surface facing the image plane I side.

The fifth lens group G5 is composed of a cemented lens constructed by, in order from the object, a double convex positive lens cemented with a double concave negative lens.

Focusing from infinity to a close object is carried out by moving the front lens group G2a to the image plane I side. An aperture stop S is disposed to the most object side of the third lens group G3 and moved with the third lens group in a body upon zooming from the wide-angle end state W to the telephoto end state T.

Various values of the zoom lens system according to Example 4 are listed in Table 4.

TABLE 4

[Specifications]

| | W | T |
|---|---|---|
| f = | 24.78 | 67.7 |
| FNO = | 2.92 | |
| 2ω = | 82.2 | 35.4° |

[Lens Data]

| | r | d | νd | nd |
|---|---|---|---|---|
| 1 | 120.00 | 3.00 | 49.52 | 1.744429 |
| 2* | 27.87 | 14.50 | | |
| 3 | −140.00 | 2.20 | 63.33 | 1.618 |
| 4 | 87.55 | 0.20 | | |
| 5 | 56.59 | 4.00 | 31.31 | 1.90366 |
| 6 | 100.69 | (d6) | | |
| 7* | 60.51 | 0.10 | 38.09 | 1.55389 |
| 8 | 63.20 | 4.51 | 49.60 | 1.772499 |
| 9 | −9682.46 | 6.00 | | |
| 10 | 117.81 | 1.47 | 26.52 | 1.761821 |
| 11 | 30.70 | 8.40 | 82.56 | 1.49782 |
| 12 | −195.19 | (d12) | | |
| 13 | 59.30 | 4.85 | 40.76 | 1.882997 |
| 14 | −527.45 | (d14) | | |
| 17 | ∞ | 1.65 | Aperture Stop S | |
| 16 | −516.24 | 3.46 | 23.06 | 1.86074 |
| 17 | −34.64 | 1.10 | 52.32 | 1.754998 |
| 18 | 61.49 | 2.97 | | |
| 19 | −42.94 | 1.05 | 52.32 | 1.754998 |
| 20 | −139.62 | (d20) | | |
| 21 | 372.93 | 1.10 | 25.42 | 1.805181 |
| 22 | 48.37 | 7.00 | 82.56 | 1.49782 |
| 23 | −32.58 | 0.20 | | |
| 24 | −784.3 | 2.50 | 49.60 | 1.772499 |
| 25 | −136.22 | 0.09 | 38.09 | 1.55389 |
| 26* | −150.00 | (d26) | | |
| 27 | 40.92 | 6.00 | 82.56 | 1.49782 |
| 28 | −276.81 | 1.40 | 25.42 | 1.805181 |
| 29 | 95.99 | Bf | | |

[Aspherical Data]

Surface Number 2

κ = −1.2870E−01
C4 = 3.7539E−06
C6 = −1.7076E−09
C8 = 1.0990E−11
C10 = −1.6921E−14
C12 = 1.1239E−17

Surface Number 7

κ = 1.1000E−01
C4 = −5.5738E−07
C6 = 1.2030E−10
C8 = 1.3357E−12
C10 = −1.7946E−15
C12 = 0.0000

Surface Number 26

κ = 9.4244E+00
C4 = 2.5528E−06
C6 = 8.0499E−09
C8 = −5.1196E−11
C10 = 1.9412E−13
C12 = −2.7823E−16

TABLE 4-continued

[Variable Distances]

|  | W | M | T |
|---|---|---|---|
| f | 24.78 | 52.00 | 67.70 |
| d6 | 48.45 | 12.43 | 1.85 |
| d12 | 7.39 | 7.39 | 7.39 |
| d14 | 1.35 | 16.36 | 26.28 |
| d20 | 16.95 | 8.43 | 1.60 |
| d26 | 1.30 | 11.68 | 24.04 |

[Values for Conditional Expressions]

(1): β5 = 0.81
(2): S45w/fw = −0.51
(3): f1 × Fnot/ft = −1.65
(4): νd = 82.6
(5): f2a/f2b = 1.27

Figure 8A:
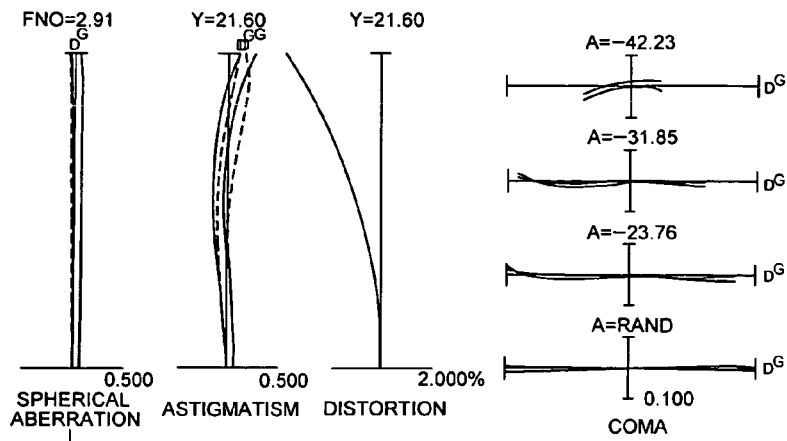
Figure 8B:
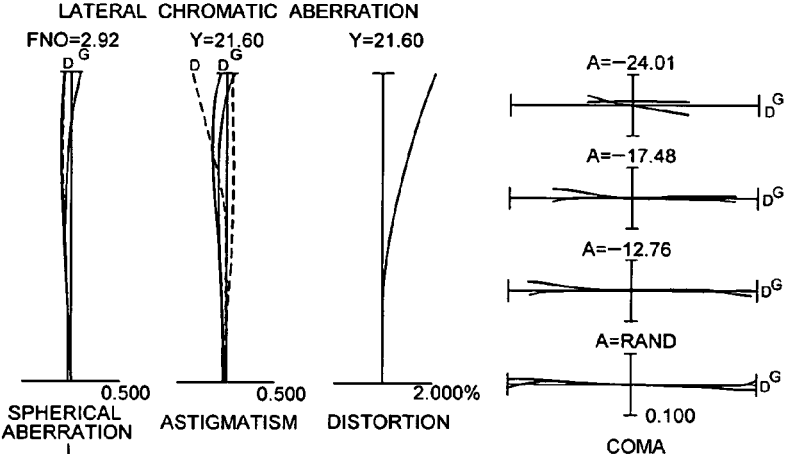
Figure 8C:
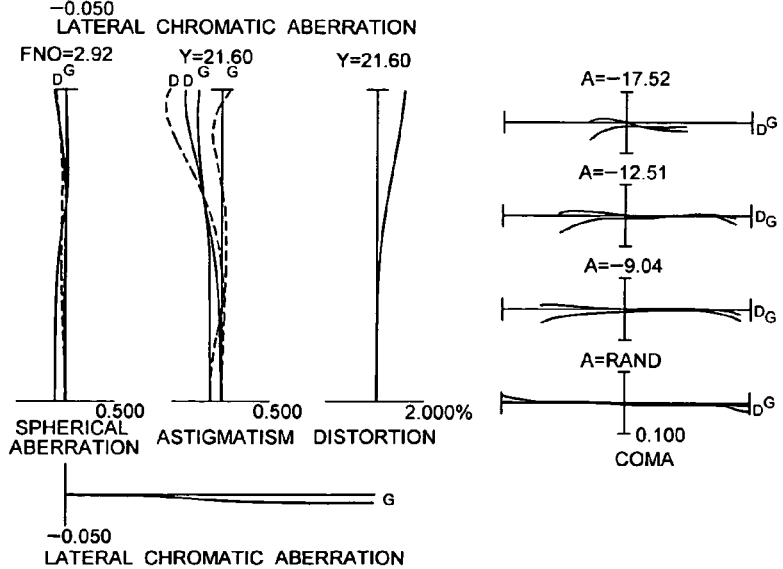

FIGS. 8A, 8B, and 8C are graphs showing various aberrations of the zoom lens system according to Example 4 focusing on infinity in which FIG. 8A shows various aberrations in a wide-angle end state W, FIG. 8B shows various aberrations in an intermediate focal length state M, and FIG. 8C shows various aberrations in a telephoto end state T.

As is apparent from the respective graphs, the zoom lens system according to Example 4 shows superb optical performance as a result of good corrections to various aberrations in each focal length state.

As described above, the present invention makes it possible to provide a zoom lens system that is suitable for a single-lens reflex camera, a digital camera, and the like and has higher optical performance, a wide maximum angle of view of 80 degrees or more, a zoom ratio of about 2.7, and a fast aperture ratio with an f-number of about 2.8.

Incidentally, it is needless to say that although a zoom lens system with a five-lens-group configuration is shown in each Example of the present invention, a zoom lens system simply added by a lens group to a five-lens-group configuration is included in the spirit of the present invention. Moreover, in the configuration of each lens group, a lens group simply added by additional lens elements to the lens group shown in each Example is included in the spirit or scope of the present invention.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object side toward an image side:
a first lens group having negative refractive power;
a second lens group having positive refractive power;
a third lens group having negative refractive power;
a fourth lens group having positive refractive power; and
a fifth lens group having positive refractive power;
upon zooming from a wide-angle end state to a telephoto end state, the first lens group moving at first toward the image side and then toward the object side, a distance between the first lens group and the second lens group decreasing, a distance between the second lens group and the third lens group increasing, a distance between the third lens group and the fourth lens group decreasing, and a distance between the fourth lens group and the fifth lens group increasing,
wherein the following conditional expression is satisfied:

$$S45w/fw < -0.15$$

where fw denotes a focal length of the zoom lens system in the wide-angle end state, and S45w denotes a position of the primary principal point of the fifth lens group measured along the optical axis from the secondary principal point of the fourth lens group.

2. The zoom lens system according to claim 1, wherein the following conditional expression is satisfied:

$$0.6 < \beta 5 < 0.9$$

where β5 denotes a lateral magnification of the fifth lens group.

3. The zoom lens system according to claim 2, wherein the following conditional expression is satisfied:

$$-1.8 < f1 \times Fnot/ft < -1.0$$

where Fnot denotes an f-number of the zoom lens system in the telephoto end state, ft denotes a focal length of the zoom lens system in the telephoto end state, and f1 denotes a focal length of the first lens group.

4. The zoom lens system according to claim 1, wherein the following conditional expression is satisfied:

$$-1.8 < f1 \times Fnot/ft < -1.0$$

where Fnot denotes an f-number of the zoom lens system in the telephoto end state, ft denotes a focal length of the zoom lens system in the telephoto end state, and f1 denotes a focal length of the first lens group.

5. The zoom lens system according to claim 1, wherein the fifth lens group includes a cemented positive lens constructed by, in order from the object side toward the image side, a positive lens having a convex surface facing the object side cemented with a negative lens.

6. The zoom lens system according to claim 1, wherein the fourth lens group includes, in order from the object side toward the image side, a cemented positive lens constructed by a negative lens cemented with a double convex positive lens, and at least one positive lens.

7. The zoom lens system according to claim 1, wherein at least one of the fourth lens group and the fifth lens group has at least one aspherical lens and the aspherical lens has positive refractive power getting weaker from the center to the periphery of the lens.

8. The zoom lens system according to claim 1, wherein the second lens group includes at least one aspherical lens and at least one positive lens, and the following conditional expression is satisfied:

$$70 < \nu d$$

where νd denotes Abbe number of the positive lens in the second lens group.

9. The zoom lens system according to claim 1, wherein the second lens group includes, in order from the object side toward the image side, a front lens group having positive refractive power and a rear lens group having positive refractive power, focusing from infinity to a close object is carried out by moving the front lens group along the optical axis, and the following conditional expression is satisfied:

$$1.1 < f2a/f2b < 1.5$$

where f2a denotes a focal length of the front lens group, and f2b denotes a focal length of the rear lens group.

10. The zoom lens system according to claim 1, wherein the first lens group includes, in order from the object side toward the image side, a negative lens, a negative lens, and a positive lens.

11. The zoom lens system according to claim 1, wherein the third lens group includes, in order from the object side toward the image side, a positive lens, a negative lens, and a negative lens.

12. The zoom lens system according to claim 1, wherein an aperture stop is disposed to the most object side of the third lens group, and moved with the third lens group in a body upon zooming from the wide-angle end state to the telephoto end state.

13. The zoom lens system according to claim 1, wherein the first lens group includes at least one aspherical lens.

14. The zoom lens system according to claim 1, wherein the first lens group includes at least one positive lens whose refractive index at d-line is 1.9000 or more.

15. A method for forming an image of an object, comprising:
  providing a zoom lens system that includes, in order from the object side toward an image side, a first lens group having negative refractive power, a second lens group having positive refractive power, a third lens group having negative refractive power, a fourth lens group having positive refractive power, and a fifth lens group having positive refractive power; and
  when the zoom lens system moves from a wide-angle end state to a telephoto end state, varying a focal length of the zoom lens system by moving the first lens group at first toward the image side and then toward the object side, decreasing a distance between the first lens group and the second lens group, increasing a distance between the second lens group and the third lens group, decreasing a distance between the third lens group and the fourth lens group, and increasing a distance between the fourth lens group and the fifth lens group,
  wherein the following conditional expression is satisfied:

$S45w/fw < -0.15$ where fw denotes a focal length of the zoom lens system in the wide-angle end state, and S45w denotes a position of the primary principal point of the fifth lens group measured along the optical axis from the secondary principal point of the fourth lens group.

16. The method according to claim 15,
  wherein the following conditional expression is satisfied:

$0.6 < \beta 5 < 0.9$ where β5 denotes a lateral magnification of the fifth lens group.

17. The method according to claim 15,
  wherein the following conditional expression is satisfied:

$-1.8 < f1 \times Fnot/ft < -1.0$ where Fnot denotes an f-number of the zoom lens system in the telephoto end state, ft denotes a focal length of the zoom lens system in the telephoto end state, and f1 denotes a focal length of the first lens group.

18. A zoom lens system comprising, in order from an object side toward an image side:
  a first lens group having negative refractive power;
  a second lens group having positive refractive power, the second lens group including, in order from the object side toward the image side, a front lens group having positive refractive power and a rear lens group having positive refractive power;
  a third lens group having negative refractive power;
  a fourth lens group having positive refractive power; and
  a fifth lens group having positive refractive power;
  upon zooming from a wide-angle end state to a telephoto end state, the first lens group moving at first toward the image side and then toward the object side, a distance between the first lens group and the second lens group decreasing, a distance between the second lens group and the third lens group increasing, a distance between the third lens group and the fourth lens group decreasing, and a distance between the fourth lens group and the fifth lens group increasing,
  wherein focusing from infinity to a close object is carried out by moving the front lens group of the second lens group along the optical axis, and the following conditional expression is satisfied:

$1.1 < f2a/f2b < 1.5$ where f2a denotes a focal length of the front lens group, and f2b denotes a focal length of the rear lens group.

19. The zoom lens system according to claim 18,
  wherein the following conditional expression is satisfied:

$0.6 < \beta 5 < 0.9$ where β35 denotes a lateral magnification of the fifth lens group.

20. A method for forming an image of an object, comprising:
  providing a zoom lens system that includes, in order from the object side toward an image side, a first lens group having negative refractive power, a second lens group having positive refractive power , a third lens group having negative refractive power, a fourth lens group having positive refractive power, and a fifth lens group having positive refractive power, the second lens group comprising, in order from the object side toward the image side, a front lens group having positive refractive power and a rear lens group having positive refractive power;
  upon zooming from a wide-angle end state to a telephoto end state, varying focal length of the zoom lens system by moving the first lens group at first toward the image side and then toward the object side, decreasing a distance between the first lens group and the second lens group, increasing a distance between the second lens group and the third lens group, decreasing a distance between the third lens group and the fourth lens group, and increasing a distance between the fourth lens group and the fifth lens group; and
  carrying out focusing from infinity to a close object by moving the front lens group of the second lens group along the optical axis,
  wherein the following conditional expression is satisfied:

$1.1 < f2a/f2b < 1.5$ where f2a denotes a focal length of the front lens group, and f2b denotes a focal length of the rear lens group.

* * * * *